United States Patent

[11] 3,601,254

| [72] | Inventor | Jan Reede |
| | | Weesp, Netherlands |
| [21] | Appl. No. | 7,053 |
| [22] | Filed | Jan. 30, 1970 |
| [45] | Patented | Aug. 24, 1971 |
| [73] | Assignee | Stork Amsterdam N.V. |
| | | Amsterdam, Netherlands |
| [32] | Priority | Feb. 10, 1969 |
| [33] | | Netherlands |
| [31] | | 6902050 |

[54] METHOD FOR DISCHARGING CONTAINERS, PACKED WITH COMMODITIES LIKE FOODSTUFFS, FROM A CONTINUOUSLY ADVANCING ENDLESS CONVEYOR AND A DEVICE FOR PERFORMING THIS METHOD
6 Claims, 4 Drawing Figs.

[52] U.S. Cl. .................................................. 209/71, 198/229
[51] Int. Cl. .................................................. B07c 5/36
[50] Field of Search .................................................. 209/71, 74, 90; 198/22 B, 45, 229

[56] References Cited
UNITED STATES PATENTS

| 2,369,557 | 2/1945 | Gettleman .................... | 209/90 |
| 3,300,033 | 1/1967 | Ellis .............................. | 198/229 |

*Primary Examiner*—Allen N. Knowles
*Attorney*—Waters, Roditi, Schwartz & Nissen ABSTRACT: Method for discharging containers out of a carrier from an endless conveyor of a continuous sterilizer or pasteurizer in which an intermediate sill or surface is used upon which the containers roll or glide towards a second conveyor; the sill can be tilted into a steeply inclined position between two subsequent discharging operations, in order to remove damaged or broken containers which did not pass to the second conveyor.

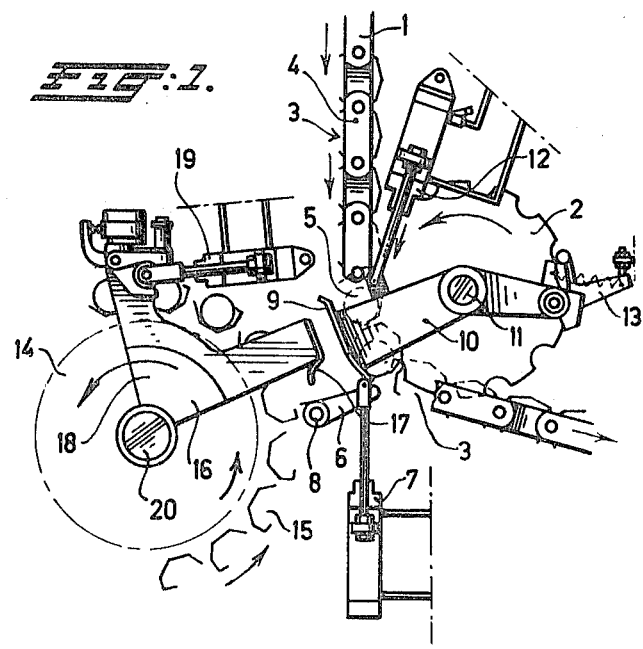
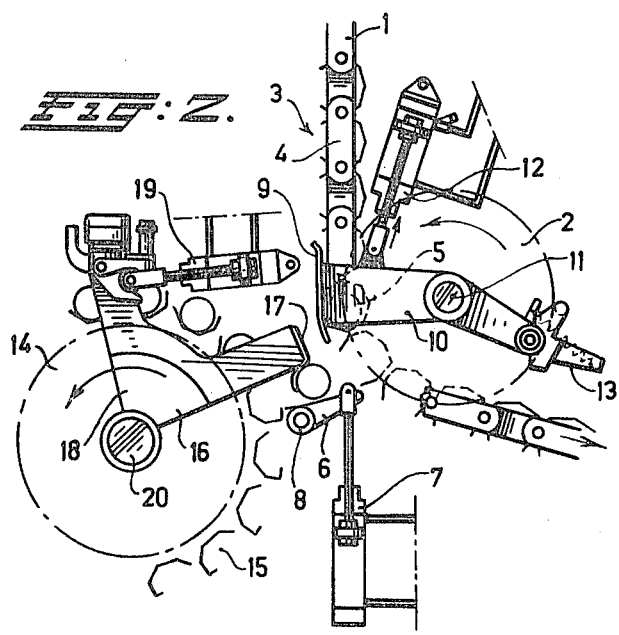

METHOD FOR DISCHARGING CONTAINERS, PACKED WITH COMMODITIES LIKE FOODSTUFFS, FROM A CONTINUOUSLY ADVANCING ENDLESS CONVEYOR AND A DEVICE FOR PERFORMING THIS METHOD

BACKGROUND OF THE INVENTION

My invention relates to a method for discharging containers, packed with commodities like foodstuffs, from a continuously advancing endless conveyor, whereby each time a gutter-shaped carrier of the conveyor with a row of containers is moved into a position in front of an inclined surface such that its open side is directed downwards or downwardly inclined.

Such a method is e.g. applied on emptying the conveyor of a continuous pasteurizer or sterilizer wherein the endless conveyor is guided along various loops up and down so as to traverse a steam space and water locks which close the steam space, vide e.g. U.S. Pat. Nos. 3,379,115, 3,384,005, 3,315,787, 3,377,173, 3,322,059, 3,211,275 and 3,163,284, and application Ser. number 608,673, now U.S. Pat. No 3,416,432, filed on Jan. 11, 1967.

As a consequence of the heating and cooling or owing to other causes there may be broken containers among the containers to be discharged.

SUMMARY OF THE INVENTION

It is an object of my invention to perform the discharging operations in such a way that the broken containers are automatically removed and consequently are not transferred to the adjoining treatment devices.

This object is attained according to my invention in that each time when a carrier of the conveyor approaches the inclined surface, the letter is moved towards a comparatively slightly inclined position whereupon the passage from the carrier to the inclined surface is made clear so that due to the force of gravity the containers move from the gutter-shaped carrier, via the inclined surface, towards a receiving member of a second conveyor, whereupon the inclined surface is tilted into a comparatively steeply inclined position in which containers, if any, or parts thereof remaining on the inclined surface may fall therefrom.

Hereby one uses the phenomenon that broken containers move with more difficulty on an inclined plane that the other containers.

This may be caused by the single fact of the fracture whereby the container or a part thereof does not so easily glide or roll, but as a rule in addition thereto the contents of a broken container mostly partially issues therefrom to thereby hamper the gliding or rolling of the container on the inclined plane.

It is a further object of my invention to render it possible to adjust the comparatively slightly inclined position of the inclined surface in such a way that the nonbroken containers glide therefrom and the broken containers or pieces thereof remain thereon.

An other object of my invention is to provide a device for performing the aforementioned method by arranging a sill pivotally between a lower part of a first and an upper part of a second conveyor, said sill being movable between a slightly downwards inclined position turned away from the first conveyor and a second, comparatively steeply inclined, position.

BRIEF DESCRIPTION OF THE DRAWINGS

FIG. 1 shows diagrammatically a side elevation of a device according to the invention in the position before the discharge is effected.

FIG. 2 is a view corresponding to FIG. 1 in the position in which the discharge is effected.

DESCRIPTION OF THE PREFERRED EMBODIMENT

Figure 3:
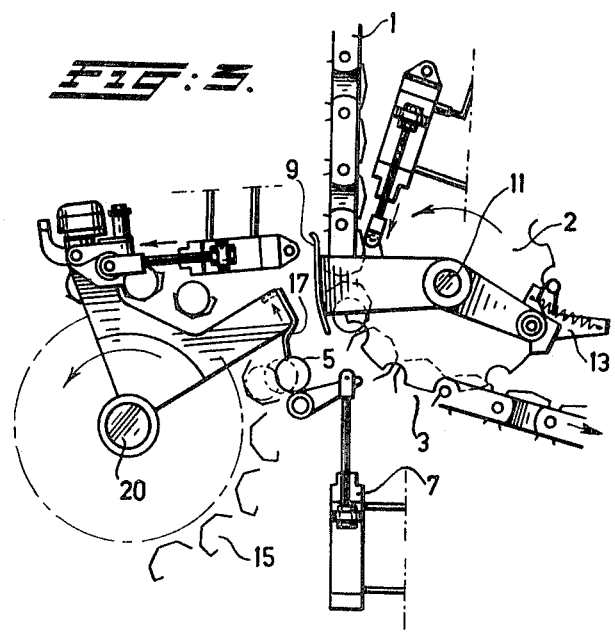
FIG. 3 is a view corresponding to FIG. 1 in the position in which the containers move toward a receiving member on a second conveyor.

In the drawing a part of a first conveyor 1 is represented which e.g. may be the conveyor of a continuous pasteurizer or sterilizer for treating foodstuffs packed in jars, bottles or tins. The shown part of the conveyor 1 is the part which leaves the treatment space in a downward direction and consequently moves around the underside of a sprocket wheel 2.

The conveyor 1 is composed of gutter-shaped carriers 3 provided between the links of a chain 4. The carriers 3 in the downwards moving part of the conveyor 1 are each filled with a row of bottles 5 or like containers. These containers 5 should be discharged at the moment whereat the carriers 3 move around the sprocket wheel 2 and so with their open side assume a downwardly inclined position.

An inclined surface 6, constituted by a sill which is articulated at its left end, is provided somewhat lower and leftwards of the sprocket wheel 2. A piston rod of a pneumatic cylinder 7 is secured to the right end of the sill 6. With this cylinder the sill 6 can be moved about the pivot 8 between the position shown in FIGS. 1–3 in which it is slightly downwards directed toward the left and the position in FIG. 4 in which it is steeply downwards directed toward the right. Between the sill 6 and the conveyor 1 a flap 9 is mounted which is rotatably mounted through the arms 10 of the shaft 11 of the sprocket 2. The arms 10 of the flap 9 are connected with a pneumatic cylinder 12. Herewith the flap 9 can be moved concentrically to the sprocket 2 up and down between a lowermost position, in which it almost bears on the sill 6 (FIG. 1), and an uppermost position, in which it leaves a passage clear for the containers 5 in a carrier 3 (FIG. 2) which has arrived at the level of the sill 6. The arms 10 of the flap 9 extend rightwards of the shaft 11. An adjusting member 13 engages to the end thereof to determine the extreme positions of the flap 9.

A sprocket wheel 14 of a second conveyor is mounted leftwards of the sill 6 and slightly lower than the sprocket wheel 2. The second conveyor is rotatable counterclockwise the latter conveyor being only indicated in the drawing by its gutter-shaped carriers 15. These carriers 15 are therefore moving upwards near the sill 6. A rotatable arm 16 is provided concentrically with the sprocket wheel 14, which at its free end is provided with a plate- or flap-shaped abutment member 17 situated above the sill 6.

The arm 16 has a laterally protruding portion 18 to the end of which a pneumatic cylinder 19 is applied. The arm 16 with the abutment member 17 can be oscillated about the shaft 20 of the sprocket wheel 14 between a lowermost position in which the abutment 17 lies right over the sill 6 in order to stop the containers 5 situated thereon (FIG. 2) and an uppermost position in which the passage for the containers situated on the sill 6 is left clear, so that they are loaded into a receiving member or carrier 15 of the second conveyor moving around the sprocket wheel 14 (FIG. 3).

The operation of the pneumatic cylinders 7, 12 and 19 is mutually coordinated and also related with the movement of the carriers 3 and 15 of the first and second conveyor past the sill 6. This can be effected in a known manner by the aid of pneumatic controls and adjustable abutments and is not described. The effect is as follows.

Prior to the arrival of a carrier 3 belonging to the downwards moving part of the conveyor 1 at the level of the sill 6, the flap 9 and the abutment 17 are moved into the lowermost position, while the sill 6 is in the uppermost slightly inclined position, see FIG. 1. When the carrier 3 stands in readiness before the sill 6, the flap 9 is moved upwards by the pneumatic cylinder 12 and the containers 5 roll from the carrier 3 on the sill 6 until they are stopped by the abutment member 17, see FIG. 2. As soon as a receiving member or carrier 15 of the second, upwards moving, conveyor stands in readiness at the level of the sill 6, the abutment member 17 is moved upwards by means of the pneumatic cylinder 19, so that the containers 5 roll from the sill 6 and land in the carrier 15 and are discharged thereby.

Figure 4:
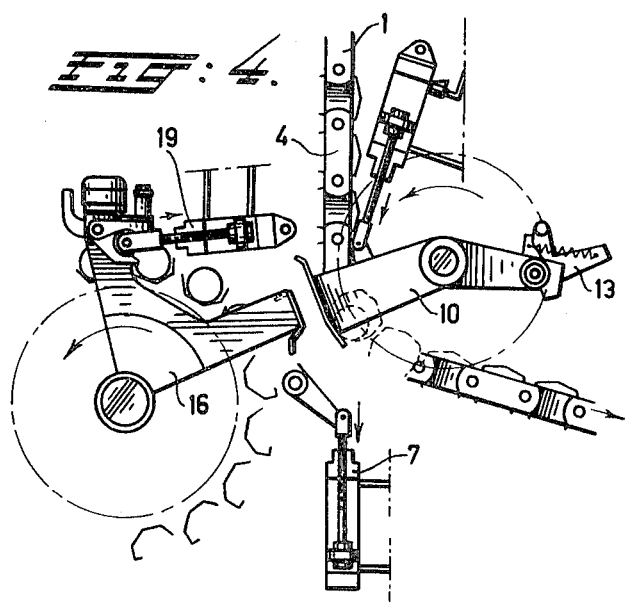
FIG. 4 is a view corresponding to FIG. 1 in the position in which the sill is tilted.

Thereupon the inclined face 6 is moved downwards by means of the pneumatic cylinder 7 into an oppositely inclined position, see FIG. 4, with a rather steep inclination. The flap 9 and the abutment member 17 return to their lowermost position. If there are still containers or rests of containers on the sill 6 they fall from the steeply inclined still into a receptacle or the like. One uses the phenomenom that undamaged containers roll or glide easily on a comparatively slightly inclined surface, whereas damaged containers require a rather steep slant to roll or glide by gravity from an inclined surface.

The principal cause is that the contents of the damaged container will partially issue therefrom to thereby increase the friction; the damage may however also be exclusively the cause of a hampered sliding. Glass fragments will remain on the sill as long as it assumes the position of FIGS. 1-3 and only in the position according to FIG. 4 they will slide therefrom. The upper and lower position of the sill may be adjustable so that the positions can be experimentally determined in which an optimal separation between damaged and undamaged containers is obtained.

The two extreme positions of the sill 6 are preferably oppositely directed with respect to one the other, because rightwards of the sill there is more space available for the discharge of broken or damaged containers. It is however not excluded to support the sill pivotally on its rights side and to tilt it from the position as represented in FIG. 3 to the left into an almost vertical position. A receptacle or the like can then be provided under the sill.

What I claim is:

1. A method for discharging containers packed with commodities like foodstuffs, from a continuously advancing endless conveyor, whereby each time a gutter-shpaed carrier of the conveyor with a row of containers is moved into a position in front of an inclined surface such that its open side is directed downwards or downwardly inclined, the improvement consisting in that each time when a carrier approaches the inclined surface, the latter is moved towards a comparatively slightly inclined position, whereupon the passage from the carrier to the inclined surface is made clear so that due to the force of gravity the containers move from the gutter-shaped carrier via the inclined surface, to a receiving member of a second conveyor, whereupon the inclined surface is tilted into a comparatively steeply inclined position in which containers, if any, or parts thereof remaining on the inclined surface may fall therefrom.

2. A method according to claim 1, characterized in that, a movable abutment member is brought into a position between the inclined surface and the second conveyor, after the inclined surface has been moved into a slightly inclined position, in order to stop the containers on the inclined surface, while as soon as a receiving member on the second conveyor is ready to receive the containers the abutment member is moved to allow the containers on the inclined surface to pass to the receiving member.

3. A device for performing the method according to claim 1 comprising a continuously advancing endless first conveyor with gutter-shaped carriers for conveying rows of containers through a thermal treatment space, a second conveyor for discharging the containers after their passage through said space, the improvement consisting in that a sill is pivotally arranged between a lower part of the first conveyor and an upper part of the second conveyor, said sill being movable between a slightly downwards inclined position turned away from the first conveyor and a second comparatively steeply inclined position.

4. A device according to claim 3, wherein the second conveyor is guided around a sprocket wheel situated beside the pivoted sill, characterized in that above the pivotally arranged sill an abutment member is provided adapted to oscillate concentrically with the sprocket wheel.

5. A device according to claim 3, characterized in that the pivoted sill is movable between two positions inclined in opposite direction with respect to one the other.

6. A device according to claim 4, characterized in that the extreme positions of the sill and/or of the abutment member are adjustable.